United States Patent
Angelucci et al.

(10) Patent No.: US 7,546,958 B2
(45) Date of Patent: Jun. 16, 2009

(54) HIGH-DENSITY TWO-DIMENSIONAL GRAPHIC CODE, AND CODING SYSTEM AND DECODING SYSTEM BASED ON SAID CODE

(75) Inventors: Marco Angelucci, Rome (IT); Sandro Fontana, Rome (IT)

(73) Assignee: Secure Edge S.r.L. (IT)

( * ) Notice: Subject to any disclaimer, the term of this patent is extended or adjusted under 35 U.S.C. 154(b) by 42 days.

(21) Appl. No.: 11/381,826

(22) Filed: May 5, 2006

(65) Prior Publication Data
US 2006/0261175 A1    Nov. 23, 2006

(30) Foreign Application Priority Data
May 6, 2005    (IT)    ............................ MI2005A0824

(51) Int. Cl.
G06K 19/06    (2006.01)
(52) U.S. Cl. ....................................................... 235/494
(58) Field of Classification Search ............ 235/462.09, 235/494, 462.01
See application file for complete search history.

(56) References Cited

U.S. PATENT DOCUMENTS

| | | | |
|---|---|---|---|
| 4,286,146 A * | 8/1981 | Uno et al. ................... | 235/456 |
| 5,221,833 A | 6/1993 | Hecht | |
| 5,449,896 A * | 9/1995 | Hecht et al. ................. | 235/494 |
| 5,464,974 A * | 11/1995 | Priddy et al. ................ | 235/494 |
| 5,507,527 A * | 4/1996 | Tomioka et al. .............. | 283/93 |
| 5,984,189 A * | 11/1999 | Tomioka ..................... | 235/487 |
| 6,201,901 B1 * | 3/2001 | Zhou et al. .................. | 382/306 |
| 7,264,174 B2 * | 9/2007 | Chang et al. ................ | 235/494 |
| 2004/0165219 A1 | 8/2004 | Chen | |
| 2007/0090177 A1 * | 4/2007 | Mitamura .................... | 235/375 |
| 2007/0158420 A1 * | 7/2007 | Sonoda et al. .............. | 235/454 |

FOREIGN PATENT DOCUMENTS

EP    0836149 A2    4/1998

OTHER PUBLICATIONS

European Search Report and Abstract, 5 pages, dated Oct. 22, 2007.

* cited by examiner

*Primary Examiner*—Daniel A Hess
(74) *Attorney, Agent, or Firm*—Banner & Witcoff, Ltd.

(57) ABSTRACT

A two-dimensional graphic code includes a plurality of characters printed on a medium, arranged so that they are contiguous to one another and organized in a primary reading direction and a secondary reading direction. Each character is defined by a respective matrix of dots having selectively one between a high brightness level and a low brightness level and includes a respective usable submatrix and a respective separation region. The usable submatrix includes at least two contiguous dots both having the low brightness level, and the separation region is configured so as to outline the respective usable submatrix all along two adjacent sides.

8 Claims, 3 Drawing Sheets

HIGH-DENSITY TWO-DIMENSIONAL GRAPHIC CODE, AND CODING SYSTEM AND DECODING SYSTEM BASED ON SAID CODE

The present invention relates to a high-density two-dimensional graphic code, and to a coding system and a decoding system based on said code.

BACKGROUND OF THE INVENTION

As is known, one-dimensional bar-codes are extremely widely used for graphic coding of small amounts of information. The bar-codes can easily be printed directly on a generic object or on a label to be applied on the object itself and are organized so that the information carried thereby can be automatically acquired by optical apparatuses that are fast and simple to use. In particular, the information is encoded through a succession, according to a pre-determined direction, of bars of various thickness, separated by spaces, which are also of various thickness. The major limit of traditional one-dimensional bar-codes lies in the limited number of characters that can be encoded, up to a few tens of alphanumeric characters, which entails a low density of information that can be obtained. Their use is not therefore advantageous when it is necessary to encode an even modest amount of data.

In order to overcome the above limit, the use of two-dimensional graphic codes has been proposed, which can be of a stacked or of a matrix type. Two-dimensional stacked codes are organized with successions of bars separated by spaces in a first direction, basically as one-dimensional codes. In two-dimensional stacked codes, however, various successions are present, arranged alongside one another in a second direction perpendicular to the first direction.

Two-dimensional matrix codes use, instead, sets of characters that are juxtaposed within a field, usually quadrangular, and are defined by dot matrices. Each dot can assume selectively one between two admissible brightness levels (typically, white and black).

Two-dimensional codes then contain service information (delimiters, reference signs, dimensional indicators, etc.), corresponding to the dimensions and to the orientation of the field containing the useful information.

In any case, two-dimensional codes are able to carry only an amount of information that is rather limited, also because they are markedly tied down to a pre-determined geometry. These codes can typically carry approximately two thousand alphanumeric characters, which are reduced to little less than one thousand if they are used for carrying bytes.

The density of information that can be obtained with two-dimensional codes is certainly higher than the density of one-dimensional bar-codes. However, the correlations between contiguous dots in terms of brightness, deriving from the technological characteristics of current printing and acquisition means, limit the maximum information encoding density to a not yet satisfactory level. In fact, the actual impression of a single dot on the printing medium is not sufficiently repeatable with currently available computer printing processes (ink jet or bubble ink jet, heat transfer of ink). In practice, in order to prevent systematic reading errors, it is necessary to use a printing resolution far lower than the theoretically available one, at the expense of density and total dimensions of printed two-dimensional codes. Given very high nominal densities, the maximum density that can realistically be obtained using a high-quality laser printer does not today exceed in practice 1600 bytes per square inch (as against a maximum density of more than 11000 bytes per square inch that can theoretically be obtained operating with a resolution of 300 dpi).

Alternatively, it would be necessary to use printing and acquisition means that are so costly as to render use of two-dimensional codes unavailable in the majority of possible applications. Consequently, in actual fact, current two-dimensional codes are not suitable for coding large amounts of information.

SUMMARY OF THE INVENTION

The aim of the present invention is to provide a two-dimensional graphic code, and a coding system and a decoding system based on said code that will enable the limitations described above to be overcome and, in particular, given the same printing and image-acquisition means, will enable a higher density of information encoding to be obtained.

According to the present invention a two-dimensional graphic code, a two-dimensional graphic coding system and a two-dimensional graphic codes decoding system are provided as claimed in the attached Claims.

BRIEF DESCRIPTION OF THE DRAWINGS

For a better understanding of the invention, an embodiment thereof is now described, purely by way of non-limiting example and with reference to the attached drawings, in which.

DETAILED DESCRIPTION OF THE INVENTION

Figure 1:
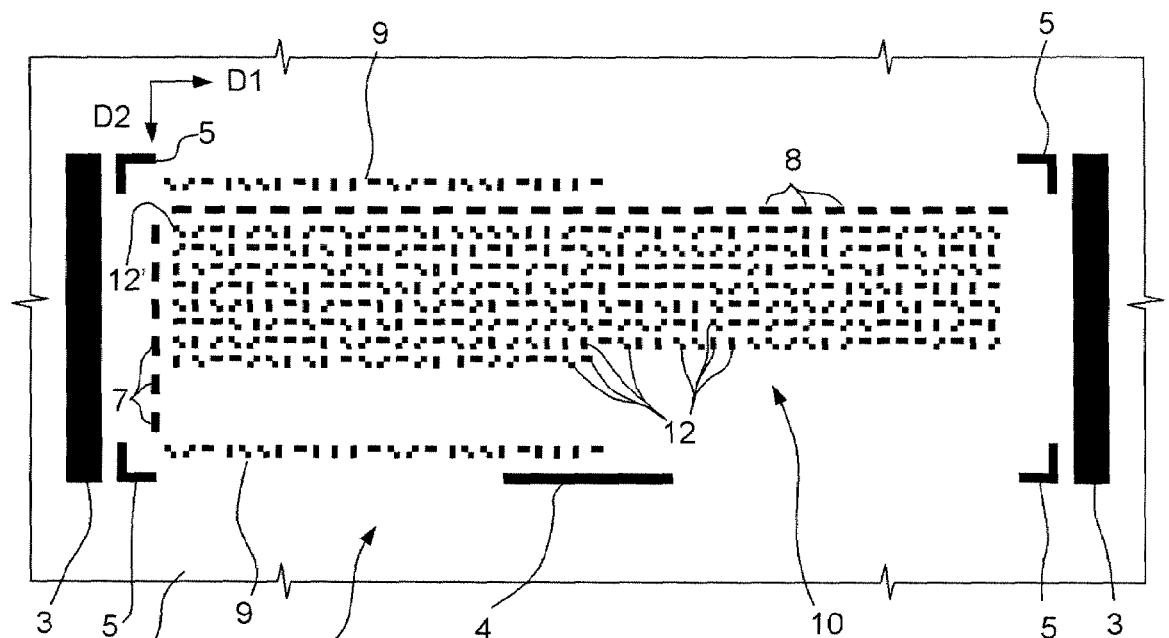
FIG. 1 shows a two-dimensional graphic code provided according to an embodiment of the present invention.

With reference to FIG. 1, a two-dimensional graphic code, designated as a whole by the reference number 1, is impressed on a medium 2, for example made of a sheet-like material. The code 1 occupies a substantially quadrangular portion of the medium 2 and defines a primary reading direction D1 and a secondary reading direction D2, orthogonal to one another. The primary reading direction D1 and the secondary reading direction D2 have orientations. Hereinafter, the terms "width" and "height" are used to indicate dimensions according to the primary reading direction D1 and to the secondary reading direction D2, respectively.

The code 1 comprises lateral-delimitation bars 3, an orientation bar 4, angular markers 5, row and column delimiters 7, 8, a header field 9 and a body 10.

The delimitation bars 3 are located at opposite margins of the code 1 with respect to the primary reading direction D1 and extend in the secondary reading direction D2 for a stretch equal to the height of the code 1 itself. The width of the delimitation bands 3 is such as to enable acquisition of a reference brightness level.

The orientation bar 4 and the angular markers 5 are respectively arranged on one side of (with respect to the secondary reading direction D2) and around the body 10 of the code 1 and define the geometry and orientation thereof in order to facilitate the decoding process.

The row and column delimiters 7, 8, arranged on adjacent sides of the body 10, provide reference for scanning of the body 10 itself during decoding.

The header field 9 is repeated at opposite sides of the body 10 with respect to the secondary reading direction D2 and contains information on the dimensions of the body 10, which is correlated to the maximum capacity and to the density of the code 1, and to the amount of information effectively encoded (in practice, a portion of the body 10 could be empty).

Figure 2:
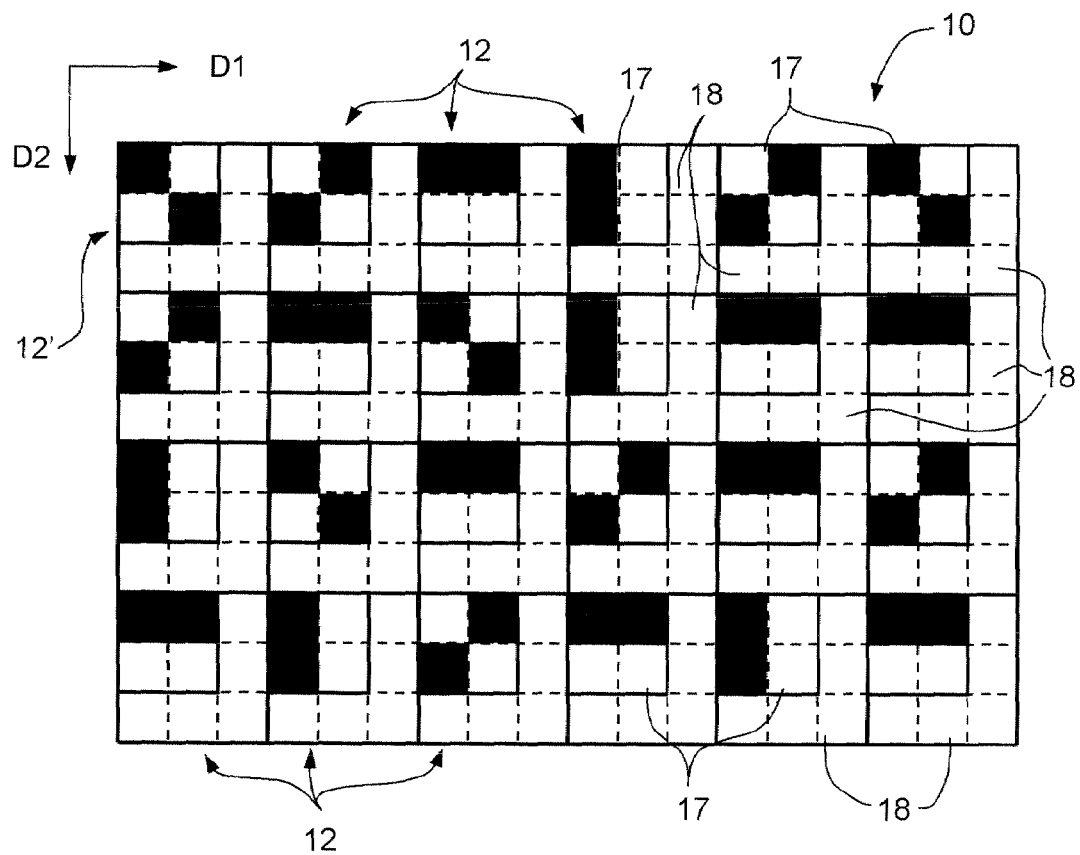
FIGS. 2 and 3 show enlarged details of the two-dimensional graphic code of FIG. 1.
Figure 3:
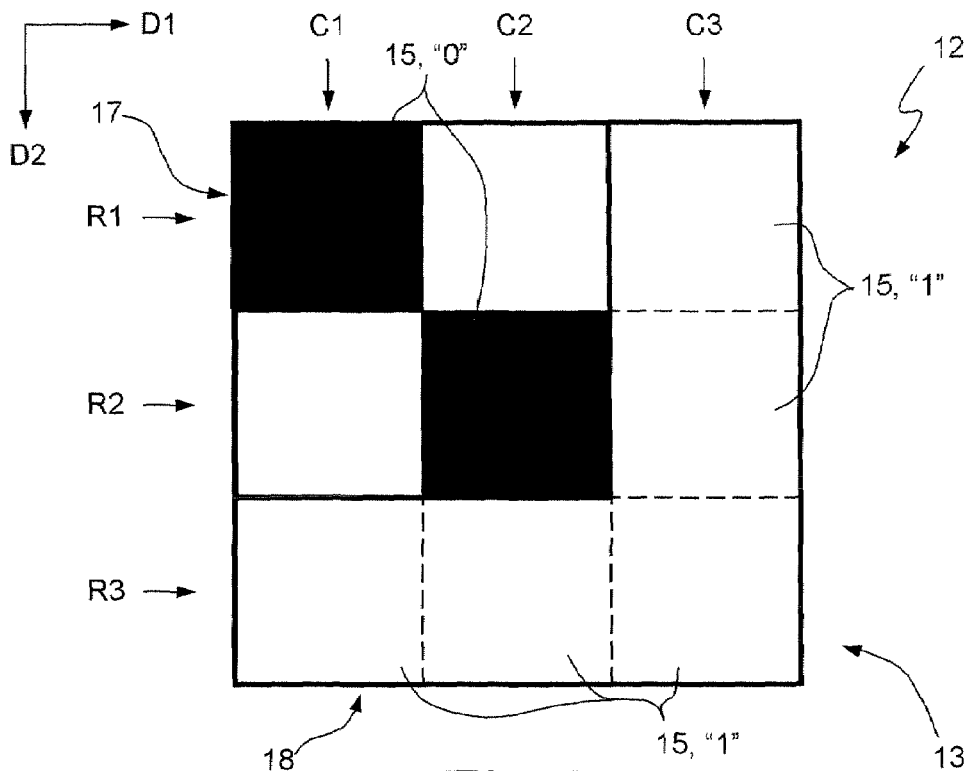

As shown in FIG. 2, the body 10 of the code 1 comprises a plurality of characters 12, arranged so that they are contiguous to one another and organized in body rows and body columns according to the primary reading direction D1 and to the secondary reading direction D2, respectively. With reference to FIG. 3, each character 12 is defined by a respective matrix 13 of dots 15. In the embodiment described, the matrices 13 are 3×3 square matrices and have three character rows R1, R2, R3 and three character columns C1, C2, C3. It should be noted that the row and column delimiters 7, 8 have the same height and the same width as the characters 12.

The dots 15 selectively have one between a high brightness level and a low brightness level. The high brightness level substantially corresponds to white and a first logic value is associated thereto, for example "1". Instead, the low brightness level substantially corresponds to black and a second logic value is associated thereto, for example "0".

Each character 12 further comprises a respective usable submatrix 17 (in the example described a 2×2 square matrix) and a respective separation region 18.

The separation region 18 is configured so as to outline the respective usable submatrix 17 all along two adjacent sides. In greater detail, in each character 12, the separation region 18 includes the dots 15 of the character row R3 and of the character column C3 that define adjacent edges of the respective matrix 13. In practice (FIG. 2), the characters 12 are arranged so that the usable submatrix 17 of each character 12 other than an initial character 12' borders on separation regions 18 of adjacent characters 12 and is separate from the usable submatrices 17 of all the adjacent characters 12. Preferably, all the dots 15 of the separation region 18 of each character 12 have the high brightness level ("1"). In the embodiment described herein, moreover, the usable submatrix 17 of each character 12 precedes the character column C3 and the character row R3 belonging to the respective separation region 18, according to the primary reading direction D1 and to the secondary reading direction D2, respectively.

Figure 4A:
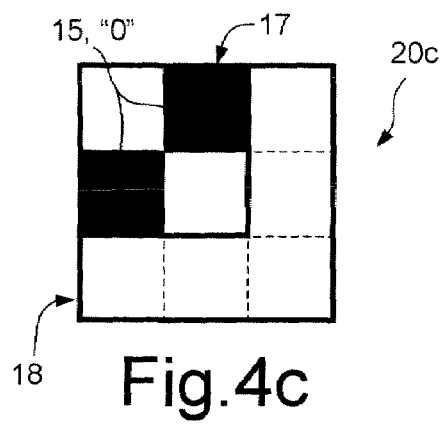
FIGS. 4a-4d show templates of characters included in the two-dimensional graphic code of FIG. 1.
Figure 4B:
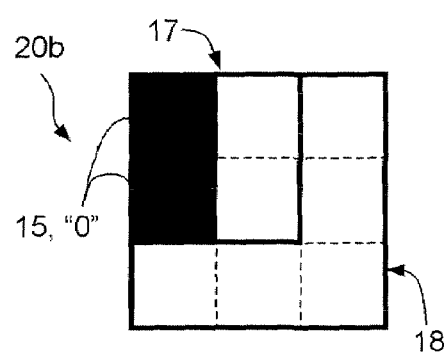
Figure 4C:
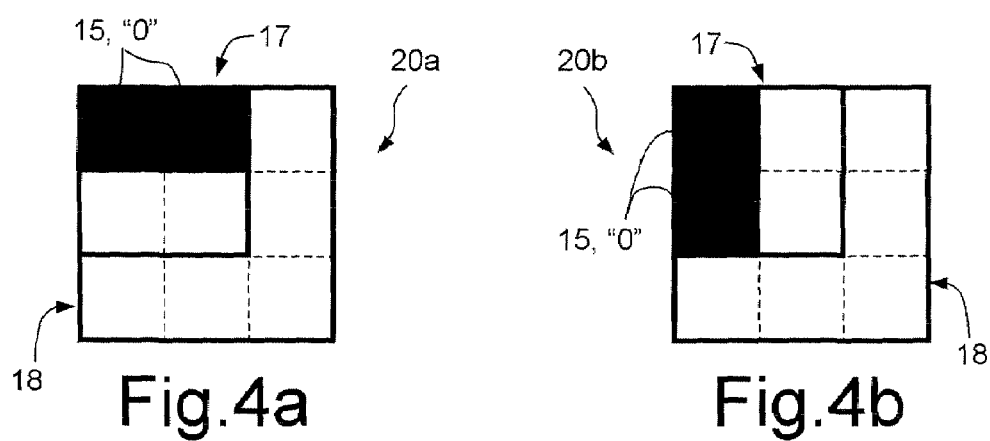
Figure 4D:
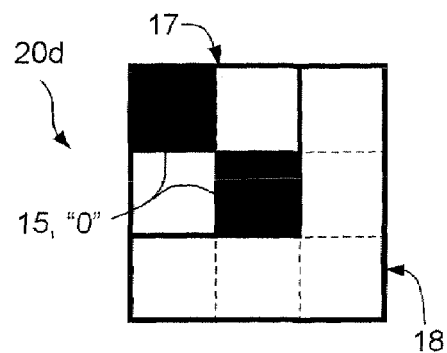

In each character 12, the usable submatrix 17 comprises at least two contiguous dots 15 both having low brightness level ("0"). Preferably, each dot 15 of the usable submatrix 17 having low brightness level is contiguous to at least one other dot 15 having low brightness level. Hereinafter, it is to be understood that each dot 15 not belonging to the edge is contiguous to other eight surrounding dots 15. In order to maximize the distinguishability of the characters 12 during decoding, moreover, among all the possible configurations a subset of template characters 20a-20d is preferentially selected and used, the usable submatrices 17 whereof have configurations that are morphologically distinct and not only topologically distinct. Two configurations are referred to as morphologically distinct when in the respective usable submatrices 17 the relative positions of the dots 15 having the same brightness level are different. For example, two characters 12, each including two dots 15 with low brightness level aligned according to the primary reading direction D1 and arranged in the character row R1 in one case and in the character row R2 in the other, are topologically, but not morphologically, distinct. Two characters 12, each including two dots 15 with low brightness level aligned according to the primary reading direction D1 in one case and according to the secondary reading direction D2 in the other, are both topologically and morphologically distinct. In the embodiment described, in particular, four template characters 20a-20d are selected:

a first template character 20a (FIG. 4a) includes two dots 15 with low brightness level ("0"), aligned in the primary reading direction D1;

a second template character 20b (FIG. 4b) includes two dots 15 with low brightness level ("0"), aligned in the secondary reading direction D2; and a third template character 20c (FIG. 4c) and a fourth template character 20d (FIG. 4d) include each two dots 15 with low brightness level ("0") arranged diagonally and in directions rotated through 90° with respect to one another.

The characters 12 are distinct items of respective template characters 20a-20b.

In this way, each character 12 encodes an amount of information equal to two bits and, in order to encode a byte, four characters 12 are required.

The code 1 basically exploits the fact that, using conventional printing techniques, such as ink-jet printing or heat transfer of ink, an effect of correlation occurs on pairs or small groups of contiguous dots with low brightness level (hence printed by ink or toner transposition on the medium and not simply defined by unprinted portions of the medium). In practice, the actual impression of contiguous dots is significantly wider than the union of the individual impressions of isolated dots.

The use of the separation regions 18 to separate the usable submatrices 17 enables superposition and confusion of contiguous characters 12 to be prevented and moreover favours preservation of the alignment according to the primary reading direction D1 and to the secondary reading direction D2.

The overall effect is a contrast amplification that favours the distinguishability of the characters during decoding. It is thus possible to use a very high printing resolution, even though the impression of the single dots is not perfectly defined. The reduction in the dimensions of the characters, deriving from the high printing resolution, markedly prevails over the higher number of characters necessary for coding a given amount of information, and hence the overall effect is a considerable increase in the maximum density of information that can be obtained. In effect, the use of the code according to the invention enables actual densities to be obtained of the order of 10000 bytes per square inch, without increasing significantly the probability of reading errors.

The code according to the invention is moreover advantageous for its flexibility, because its dimensions can be chosen freely, for example on the basis of the extension of the available portion of the medium. The information required for decoding (dimensions, orientation, maximum code capacity, amount of information effectively encoded, etc.) is included in the code, has a modest weight as compared to the overall dimensions of the latter, and can readily be acquired. In effect, also the possibility of optimizing the geometry of the code on the basis of the characteristics of the medium enables a higher amount of information to be carried on average given the same area occupied.

Figure 5:
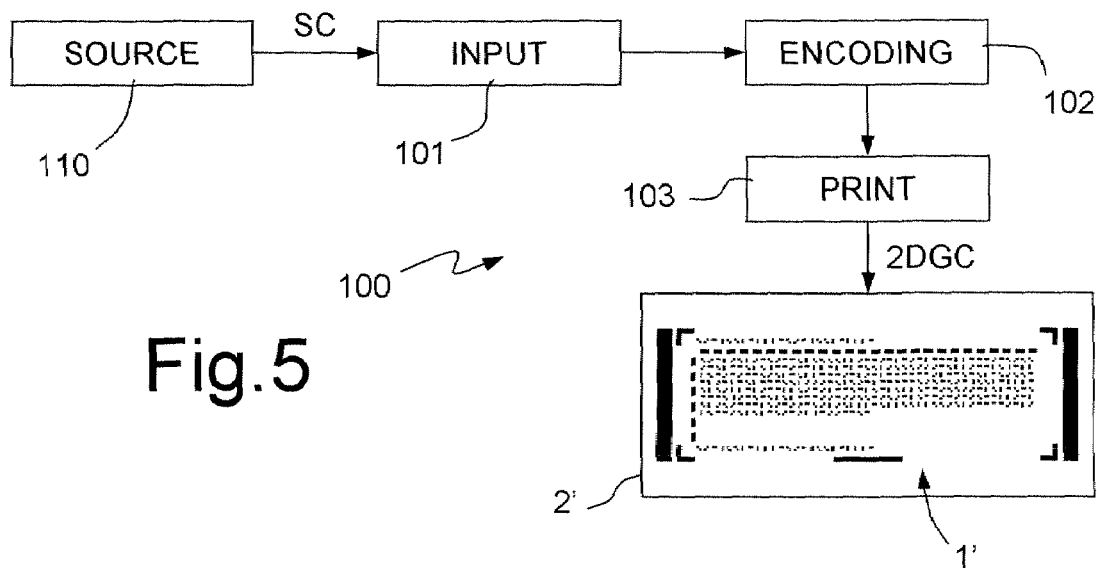
FIG. 5 is a block diagram of a two-dimensional graphic coding system based upon the two-dimensional graphic code of FIG. 1.

With reference to FIG. 5, a system 100 for coding in two-dimensional graphic format comprises an input unit 101, an encoding unit 102 and a printing unit 103 (for example a laser printer).

The input unit 101 receives a source data sequence SC from an external source 110 (for example, a control unit of a computer, which executes pre-determined processing operations and produces the source data sequence SC). The source data sequence SC is encoded in a binary format or in any other format suitable for being used by a computer.

The encoding unit 102 receives the source data sequence SC and converts it into a two-dimensional graphic code. In practice, the encoding unit 102 generates an image data sequence 2DGC, which corresponds to a two-dimensional graphic code 1' of the type described above, having contents identical to the contents of the source data sequence SC.

The printing unit 103 is controlled by the encoding unit 102 for printing the two-dimensional graphic code 1', i.e., for transferring the image data sequence 2DGC onto a medium 2'.

Figure 6:
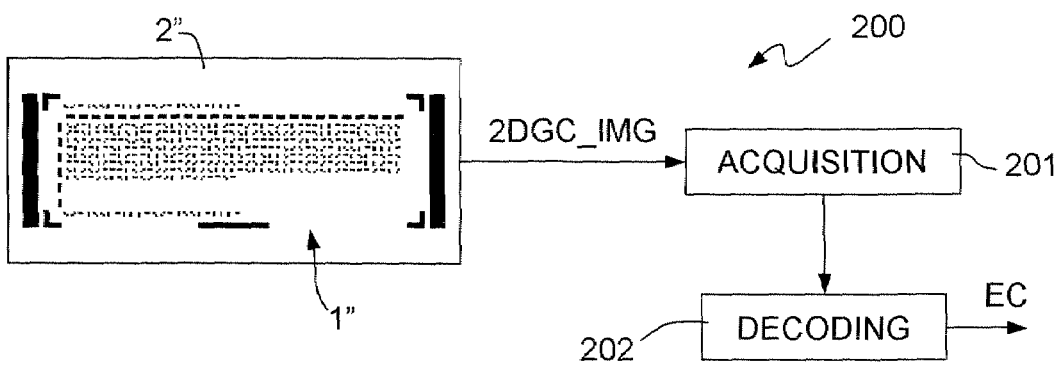
FIG. 6 is a block diagram of a system for graphic decoding of two-dimensional graphic codes based upon the two-dimensional graphic code of FIG. 1.

FIG. 6 shows a system 200 for decoding two-dimensional graphic codes, which comprises an optical device 201 for image acquisition (for example a scanner) and a decoding unit 202.

The optical device 201 acquires an image 2DCG_IMG of a two-dimensional graphic code 1" of the type described above, previously printed on a medium 2". The image 2DCG_IMG is supplied to the decoding unit 202 for being converted into a corresponding extracted data sequence EC, the contents whereof are identical to the contents of the two-dimensional graphic code 1".

Finally, it is evident that modifications and variations can be made to the code described herein, without departing from the scope of the present invention as defined in the annexed claims. In particular, the characters of the code can be defined by matrices of larger dimensions, for example 4×4 or 5×5. In these cases, also the usable submatrices can be of larger dimensions and can contain separate groups of contiguous dots with the low brightness level. In addition, the separation regions could surround the usable submatrices also on three or four sides.

Figures 7A, 7B, 7C:
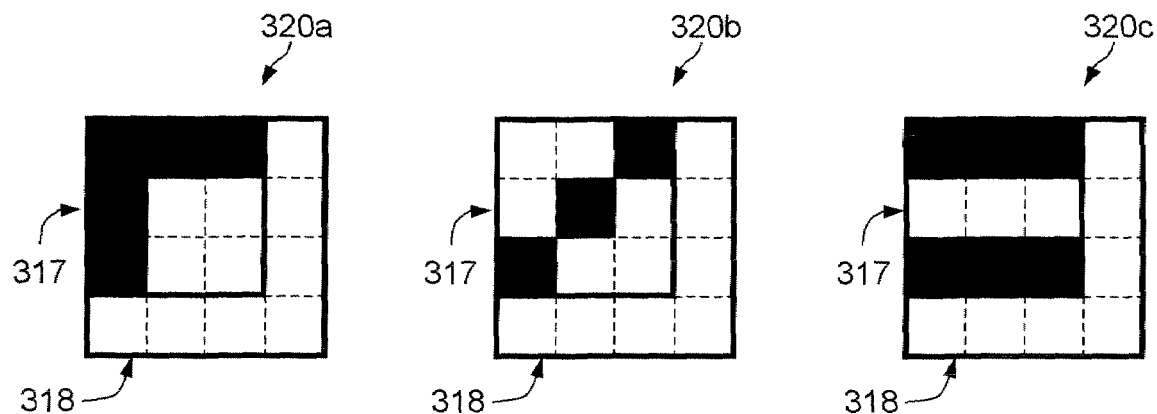
FIGS. 7a-7c show templates of characters included in a two-dimensional graphic code according to a different embodiment of the present invention.

For example, FIGS. 7a-7c illustrate some possible template characters 320a-320c including 4×4 matrices, usable submatrices 317 and separation regions 318. The usable submatrices 317 are 3×3 matrices. In the example of FIG. 7c, the template character 320c includes two groups of dots 315, which are contiguous in pairs.

What is claimed is:

1. A two-dimensional graphic code comprising a code body, decoding indicia, and a plurality of characters printed on a medium in a contiguous arrangement and organized according to a primary reading direction and a secondary reading direction;

characterized in that each character comprises a respective usable submatrix and a respective separation region, the usable submatrix comprising at least two contiguous dots both having the low brightness level and the separation region being configured so as to outline the respective usable submatrix along two adjacent sides; and wherein the decoding indicia includes a header field repeated on opposing sides of the code body, the header field containing information relating to code body dimensions, code body maximum capacity, and code body density.

2. The code according to claim 1, wherein matrices defining the characters comprise three rows and three columns each.

3. The two dimensional graphical code of claim 1, wherein the decoding indicia includes one of an orientation bar on a side of the code body and a plurality of markers positioned at corners of the code body.

4. The two-dimensional graphical code of claim 1, wherein the decoding indicia includes both an orientation bar on a side of the code body and a plurality of markers positioned at corners of the code body.

5. The two-dimensional graphical code of claim 1, wherein the decoding indicia includes row and column delimitters arranged on adjacent sides of the code body.

6. The two-dimensional graphical code of claim 1, wherein the information relating to code body dimensions, code body maximum, and code body density is displayed as at least one row of characters.

7. The two-dimensional graphical code of claim 1, wherein the decoding indicia consists of an orientation bar on a side of the code body, a plurality of markers positioned around the code body, and row and column delimiters arranged on adjacent sides of the code body.

8. The two-dimensional graphical code of claim 1, wherein the separation region and the usable submatrix are configured such the separation region for each character consists of one more dot than the associated usable submatrix for each character.

* * * * *